US012656573B2

(12) United States Patent
Fujisaki

(10) Patent No.: US 12,656,573 B2
(45) Date of Patent: Jun. 16, 2026

(54) SYSTEM AND IMAGE CAPTURING APPARATUS INCLUDING THE SAME

(71) Applicant: CANON KABUSHIKI KAISHA, Tokyo (JP)

(72) Inventor: Toyokatsu Fujisaki, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 18/056,642

(22) Filed: Nov. 17, 2022

(65) Prior Publication Data

US 2023/0161134 A1 May 25, 2023

(30) Foreign Application Priority Data

Nov. 25, 2021 (JP) .................................. 2021-191527

(51) Int. Cl.
| | |
|---|---|
| *G02B 9/04* | (2006.01) |
| *G02B 9/62* | (2006.01) |
| *G02B 13/00* | (2006.01) |
| *G02B 13/18* | (2006.01) |

(52) U.S. Cl.
CPC ................. G02B 9/04 (2013.01); G02B 9/62 (2013.01); G02B 13/0045 (2013.01); G02B 13/18 (2013.01)

(58) Field of Classification Search
CPC .................. G02B 9/04–64; G02B 9/62; G02B 13/003–0045; G02B 9/10; G02B 9/12; G02B 9/34; G02B 9/58; G02B 9/60; G02B 9/64
See application file for complete search history.

(56) References Cited

U.S. PATENT DOCUMENTS

| | | | |
|---|---|---|---|
| 2012/0212838 A1* | 8/2012 | Ohashi | G02B 9/62 |
| | | | 359/713 |
| 2018/0239115 A1 | 8/2018 | Hsu | |
| 2019/0121062 A1* | 4/2019 | Ohashi | G02B 27/0037 |
| 2019/0364216 A1* | 11/2019 | Nakahara | G02B 13/02 |
| 2020/0064592 A1* | 2/2020 | Tashiro | G02B 27/0075 |
| 2021/0223514 A1* | 7/2021 | Chang | G02B 9/62 |

FOREIGN PATENT DOCUMENTS

| | | |
|---|---|---|
| CN | 208351114 U | 1/2019 |
| JP | S61145517 A | 7/1986 |
| JP | H06222260 A | 8/1994 |
| JP | 2008310133 A | 12/2008 |
| JP | 2009020324 A | 1/2009 |
| JP | 2014089241 A | 5/2014 |
| JP | 2016048354 A | 4/2016 |
| JP | 2018106159 A | 7/2018 |

(Continued)

*Primary Examiner* — Thomas K Pham
*Assistant Examiner* — Ruby L Kauffman
(74) *Attorney, Agent, or Firm* — Canon U.S.A., Inc. IP Division

(57) ABSTRACT

A system consists of a front lens unit and a negative lens on an image side of the front lens unit. A focal length of the system, a focal length of the negative lens, an effective diameter of a lens surface on an object side of the negative lens, a diameter of an aperture stop that determines an on-axis ray, and an on-axis distance from an endmost point in a light effective area of the lens surface on the object side of the negative lens to an on-axis point of the negative lens satisfy predetermined inequalities.

19 Claims, 11 Drawing Sheets

(56)            References Cited

FOREIGN PATENT DOCUMENTS

| | | | |
|---|---|---|---|
| JP | 2019101059 | A | 6/2019 |
| JP | 2020034631 | A | 3/2020 |
| JP | 6886554 | B1 | 6/2021 |
| JP | 6896933 | B1 | 6/2021 |
| JP | 2021124674 | A | 8/2021 |
| WO | 2023070681 | A1 | 5/2023 |

* cited by examiner

SYSTEM AND IMAGE CAPTURING APPARATUS INCLUDING THE SAME

BACKGROUND

Technical Field

The aspect of the embodiments relates to optical systems and so on suitable for image capturing apparatuses, such as digital video cameras, digital still cameras, broadcasting cameras, monitoring cameras, wearable device cameras, and mobile device cameras.

Description of the Related Art

High-performance and compact optical systems have recently been required. Furthermore, small F-number (bright) optical systems have been required to enable shooting in the dark.

However, "bright" optical systems tend to increase in aperture, having difficulty in reducing in weight. Japanese Patent Laid-Open No. 2018-106159 discloses an eight-element compact optical system with an F-number of 2.0. The optical system disclosed in Japanese Patent Laid-Open No. 2018-106159 is made of a glass material to reduce in size.

However, in the optical system disclosed in Japanese Patent Laid-Open No. 2018-106159, the refractive power and the shape of a negative lens closest to the image side are not suited, which makes it difficult to achieve aberration correction and miniaturization as the F-number is decreased.

SUMMARY

A system according to an aspect of the embodiment consists of a front lens unit and a negative lens Gn on an image side of the front lens unit, wherein the following inequalities are satisfied:

$$-10.0 < fn/f < -0.7$$

$$0.9 < D/ST < 1.4$$

$$-0.50 < SAG1/f < -0.16$$

where f is a focal length of the system, fn is a focal length of the negative lens Gn, D is an effective diameter of a lens surface on an object side of the negative lens Gn, ST is a diameter of an aperture stop that determines an on-axis ray, and SAG1 is an on-axis distance from an endmost point in a light effective area of the lens surface on the object side of the negative lens Gn to an on-axis point of the negative lens Gn.

Further features of the disclosure will become apparent from the following description of exemplary embodiments with reference to the attached drawings.

DESCRIPTION OF THE EMBODIMENTS

Figure 1:
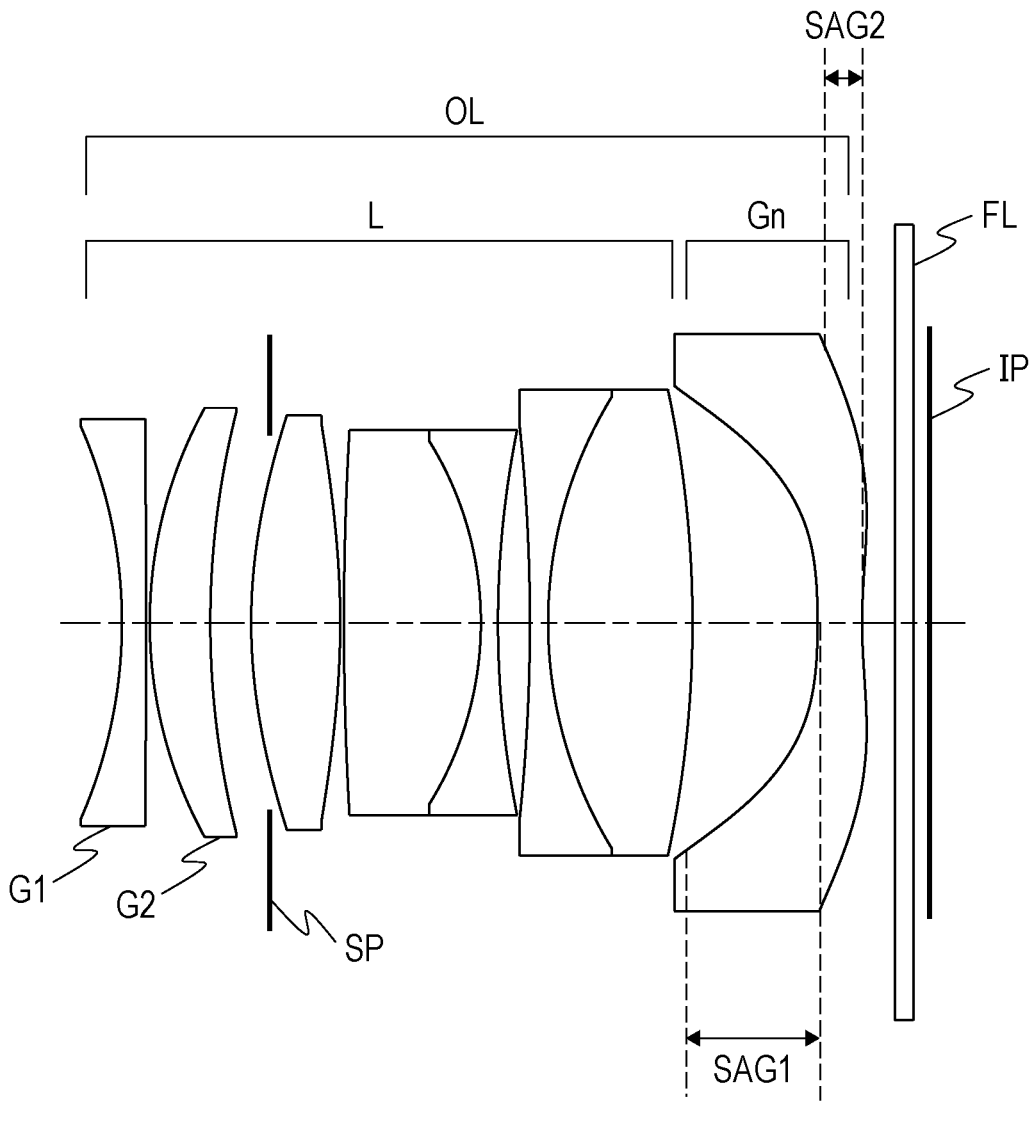
FIG. 1 is a lens cross-sectional view of an optical systems according to a first embodiment.
Figure 2:
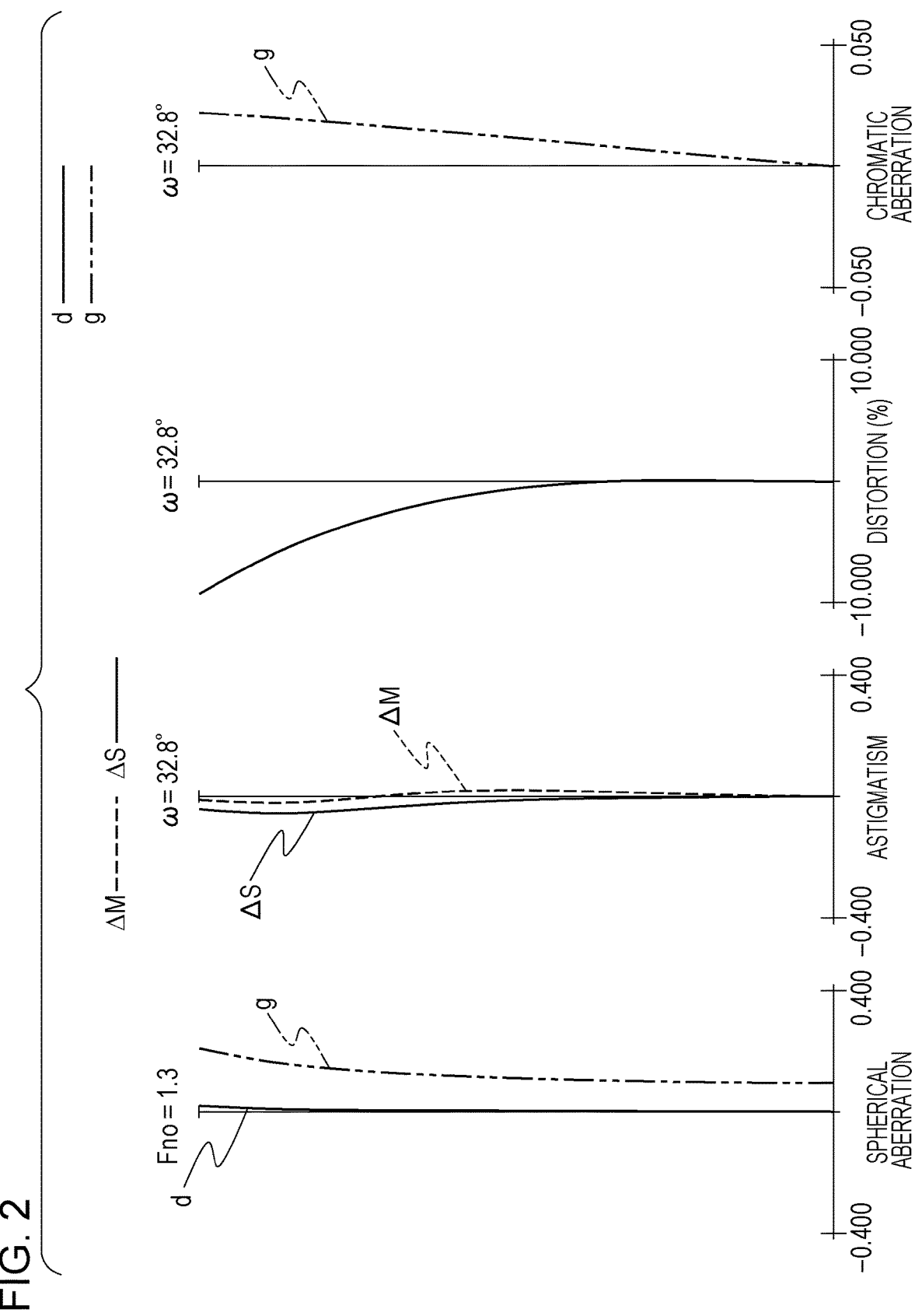
FIG. 2 is an aberration chart of the optical system according to the first embodiment.

Optical systems and an image capturing apparatus including the same according to embodiments of the disclosure will be described hereinbelow with reference to the accompanying drawings.

FIGS. 1, 3, 5, 7, and 9 are cross-sectional views of optical systems OL according to first to fifth embodiments, respectively. The optical systems OL of the embodiments are used in image capturing apparatuses, such as digital video cameras, digital still cameras, broadcasting cameras, monitoring cameras, in-vehicle cameras, wearable device cameras, and mobile device cameras.

In the lens cross-sectional views, the left side is the object side, and the right side is the image side.

The optical system OL of each embodiment consists of a front lens unit L and a negative lens Gn disposed on the image side of the front lens unit L. The front lens unit L includes an aperture stop SP.

In each lens cross-sectional view, reference sign IP denotes an image plane. In using the optical system OL of each embodiment in a digital camera, an imaging plane of a solid-state image sensor (photoelectric conversion element), such as a charge-coupled device (CCD) sensor or a complementary metal-oxide semiconductor (CMOS) sensor, is disposed in the image plane IP. In using the optical system OL of each embodiment as an imaging optical system for a silver-halide camera, a photosensitive surface corresponding to a film surface is disposed in the image plane IP. Reference sign FL denotes an optical block corresponding to an optical filter, a face plate, a low-pass filter, an infrared cut filter, or a sensor cover glass. The front lens unit L may include a flare cut-off stop that cuts off undesirable light (flare light).

The optical system OL of each embodiment may perform focusing by moving the entire optical system OL or part of the lenses of the optical system OL in the direction of the optical axis.

FIGS. 2, 4, 6, 8, and 10 are aberration charts of the respective optical systems OL of the first to fifth embodiments, showing a case in which the object distance is infinity and a case in which the object distance is a close range.

In the spherical aberration charts, reference sign Fno denotes F-number, which shows the amount of spherical aberration for d-line (wavelength 587.6 nm) and g-line (wavelength 435.8 nm). In the astigmatism charts, $\Delta S$ is the amount of aberration on a sagittal image plane, and $\Delta M$ is the amount of aberration on a meridional image plane. The distortion charts show the amount of distortion for d-line. The chromatic aberration charts show the amount of chromatic aberration of magnification for g-line. Reference sign $\omega$ denotes an imaging half angle of view (°).

Next, the characteristics of the configurations of the optical systems OL of the embodiments will be described.

In the optical systems OL of the embodiments, the negative lens Gn is disposed closest to the image side to place the principal point of the entire optical systems OL close to the front (object side), thereby enabling aberration that occurs in the front lens unit L to be corrected by the negative lens Gn while reducing the overall length of the optical system OL.

In the optical systems OL, the following Inequalities (1), (2), and (3) are satisfied to provide a wide-angle bright optical system (for example, with an F-number less than 1.8. Disposing the negative lens Gn in this manner allows correction of on-axis spherical aberration, peripheral coma aberration, and field curvature characteristic of a bright optical system while reducing the size of the optical systems OL.

$$-10.0 < fn/f < -0.7 \tag{1}$$

$$0.9 < D/ST < 1.4 \tag{2}$$

$$-0.50 < SAG1/f < -0.16 \tag{3}$$

where f is the focal length of the optical system OL, fn is the focal length of the negative lens Gn, D is the effective diameter of the object-side lens surface of the negative lens Gn, ST is the diameter of the aperture stop SP, which determines the on-axis ray, and SAG1 is the on-axis distance from the end extremity (closest to the periphery) in the light effective area of the object-side lens surface of the negative lens Gn to an on-axis point of the object-side lens surface of the negative lens Gn. The effective diameter of the lens is the diameter of a circle whose radius is the height of light from the optical axis, the light passing through a position farthest from the optical axis, of light passing through the lens surface, and SAG1 is negative on the image side.

Inequality (1) is for the focal length fn of the negative lens Gn. An increase in fn beyond the upper limit of Inequality (1) may make it difficult to correct on-axis spherical aberration with the negative lens Gn. A decrease in fn below the lower limit of Inequality (1) may make it difficult to correct the field curvature with the negative lens Gn. This increases the diameter of the negative lens Gn, hindering size reduction.

Inequality (2) defines the ratio of the maximum effective diameter D of the object-side surface of the negative lens Gn to an aperture stop diameter ST that determines the on-axis ray of the optical system OL. An increase in D beyond the upper limit of Inequality (2) makes the maximum effective diameter of the negative lens Gn larger than the aperture stop diameter ST, which may make it difficult to increase the diameter of the optical system OL while reducing the size. A decrease in D below the lower limit of Inequality (2) may make it difficult to make the optical system OL wide-angled. This also makes the peripheral rays smaller than the on-axis ray, which may cause lack of a sufficient light intensity ratio.

Inequality (3) appropriately defines the ratio of SAG1 to the focal length f of the optical system OL. An increase in SAG1 beyond the upper limit of Inequality (3) may make it difficult to make the optical system OL wide-angled. This decreases the angle of the principal rays from the periphery incident on the object-side surface of the negative lens Gn to the on-axis ray to increase the eye point distance, thereby increasing the overall length, which hinders size reduction. This may also decrease the peripheral rays relative to the on-axis ray, hindering providing a sufficient light amount ratio. A decrease in SAG1 below the lower limit of Inequality (3) may increase the angular aperture of the object-side surface of the negative lens Gn, making it difficult to process or shape the negative lens Gn.

This configuration allows for providing an optical system in which particularly ghosting can be reduced in a desired wavelength range although with a large diameter and a compact lens.

In one embodiment, at least one of the upper limit and the lower limit of the numerical range of each of Inequalities (1), (2), and (3) is set to one of the following inequalities:

$$-8.0 < fn/f < -1.0 \tag{1a}$$

$$0.9 < D/ST < 1.3 \tag{2a}$$

$$-0.45 < SAG1/f < -0.16 \tag{3a}$$

In another embodiment, at least one of the upper limit and the lower limit of the numerical range of each of Inequalities (1), (2), and (3) is set to one of the following inequalities:

$$-5.0 < fn/f < -1.1 \tag{1b}$$

$$0.92 < D/ST < 1.2 \tag{2b}$$

$$-0.35 < SAG1/f < -0.16 \tag{3b}$$

Next, configurations that may be satisfied in the optical systems OL of the embodiment will be described.

The front lens unit L may include the aperture stop SP. This facilitates size reduction of the lens unit L.

The image-side lens surface of the negative lens Gn may be an aspherical surface that is concave to the image side in the vicinity of the optical axis and that has at least one extreme point. The extreme point is a point at which the value of the first derivative of x(h) differentiated once by h is 0, where x is the amount of displacement from the surface vertex in the direction of the optical axis, h is the height from the optical axis in the direction (the radial direction) perpendicular to the optical axis, and x(h) is a function indicating an aspherical shape. In other words, the extreme point is a point which is on an aspherical surface and whose tangent plane is perpendicular to the optical axis. The image-side lens surface may have an aspherical surface having, not the extreme point, but a saddle point. The aspherical image-side lens surface of the negative lens Gn allows correction of the field curvature while preventing distortion aberration to provide high resolution from the center of the angle of view to the periphery. The extreme point may be set at any position within the effective diameter of the image-side lens surface of the negative lens Gn.

The front lens unit L may consist of at least six lenses.

Thus, the front lens unit L consists of a plurality of lenses, and the power (the reciprocal of the focal length) of each lens is set small so that various aberrations that occur in the front lens unit L, such as a spherical aberration, can be reduced or eliminated.

To make the optical system OL wide-angled, the lens closest to the object side may be a negative lens that is concave on the object side. This enables correction of distortion with the negative lens while providing a wide angle of view.

The image-side lens surface of the negative lens Gn may have at least one inflection point. The inflection point is a point at which the value of the second derivative of x(h) differentiated two times by h is 0, where x is the amount of displacement from the surface vertex in the direction of the optical axis, h is the height from the optical axis in the direction (the radial direction) perpendicular to the optical axis, and x(h) is a function indicating an aspherical shape, and in front of and behind which the sign of the second derivative changes. In other words, the inflection point is a point at which the surface shape changes from a concave shape to a convex shape or from a convex shape to a concave shape. Having the inflection point allows the peripheral refractive power to be determined without depending on the paraxial refractive power, facilitating correction of the field curvature. The inflection point also reduces or eliminates an increase in the angle of incidence of light passing through the optical system OL on the imaging plane (image sensor). The inflection point may be disposed at any position on the image side surface of the negative lens Gn and may be disposed at the periphery.

To make the optical system OL wide-angled and have a high aperture ratio, the optical system OL may have a lens configuration including negative, positive, and positive lenses in order from the object side. This allows the spherical aberration to be corrected.

Next, inequalities that are satisfied in the optical systems OL of the embodiments will be described.

In one embodiment, the optical systems OL of the embodiments satisfy at least one of Inequalities (4) to (13).

$$-0.35 < -SAG2/f < 0 \tag{4}$$

$$0.5 < GnR2/f < 10 \tag{5}$$

$$0.1 < Td/f < 2.5 \tag{6}$$

$$0 < STd/f < 0.15 \tag{7}$$

$$0.05 < skd/SL < 0.15 \tag{8}$$

$$1.45 < NdGn < 1.70 \tag{9}$$

$$0.6 < gGn < 1.7 \tag{10}$$

$$0.08 < SF1 < 12.0 \tag{11}$$

$$0.6 < |f1/f2| < 5.0 \tag{12}$$

$$1.78 < NdGp < 2.2 \tag{13}$$

where SAG2 is the on-axis distance from the end extremity (closest to the periphery) in the light effective area of the image-side lens surface of the negative lens Gn to an on-axis point of the image-side lens surface of the negative lens Gn, GnR2 is the radius of curvature of the image-side lens surface of the negative lens Gn, wherein SAG2 and GnR2 are positive on the image side, Td is the on-axis equivalent air length (overall length) from the surface vertex of the lens surface closest to the object side of the optical system OL to the image plane IP, STd is the distance between the surface vertexes of the lenses in front of and behind the aperture stop SP, skd is the on-axis equivalent air length (back focus) from the image-side lens surface of the negative lens Gn to the image plane IP when the optical system OL is in focusing on an object at infinity, SL is the on-axis equivalent air length from the aperture stop SP to the image plane IP, wherein if the optical block FL is disposed between the negative lens Gn and the image plane IP, skd and SL are values of the thickness of the optical block FL expressed as equivalent air lengths, NdGn is the refractive index of the negative lens Gn, gGn is the specific gravity (g/mm³) of the material of the negative lens Gn, SF1 is the shape factor of a lens G1 disposed closest to the object side in the optical system OL, wherein SF1 is expressed as SF1=(R2+R1)/(R2−R1), where R1 is the object-side lens surface of the lens G1, and R2 is the image-side lens surface of the lens G1, f1 is the focal length of the lens G1, f2 is the focal length of a second lens G2 counted from the object side in the optical system OL, and NdGp is the average refractive index of the positive lenses in the optical system OL.

Inequality (4) defines a condition for mainly correcting the field curvature in increasing the aperture ratio and reducing the size of the optical system OL. An increase in SAG2 beyond the upper limit of Inequality (4) may increase the ratio of the thickness of the negative lens Gn on the optical axis to the thickness of the periphery, which may make it difficult to manufacture (shape) and increases the angle of incidence on the image sensor, making vignetting due to the micro lenses disposed on the object side of the image sensor likely to occur.

A decrease in SAG2 below the lower limit of Inequality (4) may reduce the effect of correction of the field curvature using the negative lens Gn, making it difficult to correct the field curvature.

Inequality (5) defines a condition for correcting the field curvature and distortion when the optical system OL is increased in aperture diameter and reduced in size. An increase in GnR2 beyond the upper limit of Inequality (5) may make it difficult to mainly correct the field curvature. This may also increase the ratio of the thickness of the negative lens Gn on the optical axis to the periphery, making it difficult to manufacture (shape).

A decrease in GnR2 below the lower limit of Inequality (5) may mainly generate negative distortion. This may also decrease the distance between the negative lens Gn and the image sensor particularly around the negative lens Gn, which requires much more space, hindering size reduction of the optical system OL.

Inequality (6) defines a condition for reducing the size of the optical system OL while increasing the angle of view and the aperture. An increase in Td beyond the upper limit of Inequality (6) may increase the overall length Td, making size reduction difficult. A decrease in Td below the lower limit of Inequality (6) may make it difficult to provide a wide angle of view and a large aperture.

Inequality (7) defines a condition for reducing the size the overall system while increasing the aperture ratio.

An increase in STd/f beyond the upper limit of Inequality (7) may make it difficult to mainly correct the spherical aberration when the optical system OL is increased in aperture diameter. This may also increase the overall lens length, hindering size reduction.

A decrease in STd/f below the lower limit of Inequality (7) may excessively decrease the distance between the lenses next to the aperture stop SP, causing undesirable light, such as ghosting.

Inequality (8) appropriately defines the ratio of the distance skd from the image-side lens surface of the negative lens Gn to the image plane IP to the distance SL from the aperture stop SP to the image plane IP in focusing on an object at infinity. Disposing the negative lens Gn at a position appropriately distant from the aperture stop SP converges the light sufficiently to decrease the diameter of the on-axis ray. This allows the field curvature and the distortion to be corrected without exerting a significant influence on the spherical aberration.

An increase in skd/SL beyond the upper limit of Inequality (8) may decrease the height (the absolute value) of off-axis light incident on the negative lens Gn, which may cause the on-axis ray and the off-axis ray passing through the negative lens Gn not to be sufficiently separated in the direction perpendicular to the optical axis, making it difficult to correct the field curvature.

A decrease in skd/SL below the lower limit of Inequality (8) may increase the effect of correction described above but may make it difficult to dispose the optical block FL.

Inequality (9) defines a condition for correcting the field curvature while reducing the size of the optical system OL. An increase in NdGn beyond the upper limit of Inequality (9) may excessively increase the Petzval sum of the entire optical system OL in the positive direction with the reduction in the size of the optical system OL, causing the image plane to curve to the object side. A decrease in NdGn below the lower limit of Inequality (9) may excessively increase the Petzval sum of the entire optical system OL in the negative direction, causing the image plane to curve to the image side.

Inequality (10) appropriately defines the specific gravity gGn of the material for the negative lens Gn to reduce the size and weight of the optical system OL. A specific example is a transparent resin material. An increase in specific gravity gGn beyond the upper limit of Inequality (10) may cause the negative lens Gn, if increased in aperture ratio, to be increased in weight, hindering lightening. This may need to increase the size of an actuator for moving the entire lens in focusing, increasing the size of the entire lens barrel. A decrease in specific gravity gGn below the lower limit of Inequality (10) may reduce the weight of the negative lens Gn but may generally decrease the strength of the material.

Inequality (11) appropriately defines the shape factor SF1 of the lens G1 for correcting the aberrations while making the optical system OL wide-angled and increased in aperture.

An increase in SF1 beyond the upper limit of Inequality (11) may make it difficult to make the optical system OL wide-angled. A decrease in SF1 below the lower limit of Inequality (11) may make it difficult to correct the distortion in increasing the angle of view.

Inequality (12) appropriately defines the ratio of the focal length f1 of the lens G1 to the focal length f2 of the lens G2 to mainly correct the spherical aberration and the distortion in making the optical system OL wide-angled and increased in aperture diameter.

An increase in f1/f2 beyond the upper limit of Inequality (12) may make it difficult to make the optical system OL wide-angled. A decrease in f1/f2 below the lower limit of Inequality (12) may make it difficult to correct the distortion and the spherical aberration and may increase the sensitivity of aberrations to the eccentricities relative to the lenses subsequent to the lens G2, making it difficult to manufacture, which may cause degradation in optical performance.

Inequality (13) appropriately defines the average refractive index NdGp of the positive lenses to make the optical system OL increased in aperture ratio and reduced in size. An increase in NdGp beyond the upper limit of Inequality (13) may cause the field curvature to be excessively corrected. In this case, a glass material with low transmittance in a visible range tends to be used. This may decrease the transmittance. A decrease in NdGp below the lower limit of Inequality (13) may make it difficult to correct the field curvature of the negative lens Gn. To provide the edges with sufficient thickness, the positive lenses are increased in thickness, hindering size reduction.

In one embodiment, at least one of the upper limit and the lower limit of the numerical range of each of Inequalities (4) to (13) is within the range of Inequality (4a) to (13a), respectively.

$$-0.25 < -SAG2/f < 0 \tag{4a}$$

$$0.5 < GnR2/f < 5.0 \tag{5a}$$

$$0.5 < Td/f < 2.4 \tag{6a}$$

$$0 < STd/f < 0.12 \tag{7a}$$

$$0.06 < skd/SL < 0.13 \tag{8a}$$

$$1.45 < NdGn < 1.68 \tag{9a}$$

$$0.7 < gGn < 1.4 \tag{10a}$$

$$0.08 < SF1 < 5.0 \tag{11a}$$

$$0.6 < |f1/f2| < 4.0 \tag{12a}$$

$$1.78 < NdGp < 2.0 \tag{13a}$$

In another embodiment, at least one of the upper limit and the lower limit of the numerical range of each of Inequalities (4) to (13) is within the range of Inequalities (4b) to (13b).

$$-0.15 < -SAG2/f < 0 \tag{4b}$$

$$0.5 < GnR2/f < 3.0 \tag{5b}$$

$$1.0 < Td/f < 2.3 \tag{6b}$$

$$0 < STd/f < 0.10 \tag{7b}$$

$$0.08 < skd/SL < 0.13 \tag{8b}$$

$$1.50 < NdGn < 1.65 \tag{9b}$$

$$0.7 < gGn < 1.3 \tag{10b}$$

$$0.09 < SF1 < 3.0 \tag{11b}$$

$$0.65 < |f1/f2| < 3.0 \tag{12b}$$

$$1.79 < NdGp < 1.95 \tag{13b}$$

Next, the specific configurations of the optical systems OL according to the first to fifth embodiments will be described.

The optical system OL of the first embodiment shown in FIG. 1 consists of the front lens unit L and the negative lens Gn. The front lens unit L includes a negative lens, a positive lens, the aperture stop SP, a positive lens, a joined lens of a positive lens and a negative lens, and a joined lens of a negative lens and a positive lens arranged in order from the object side to the image side.

A flare cut-off stop FP may be disposed between the two joined lenses of the front lens unit L.

Figure 3:
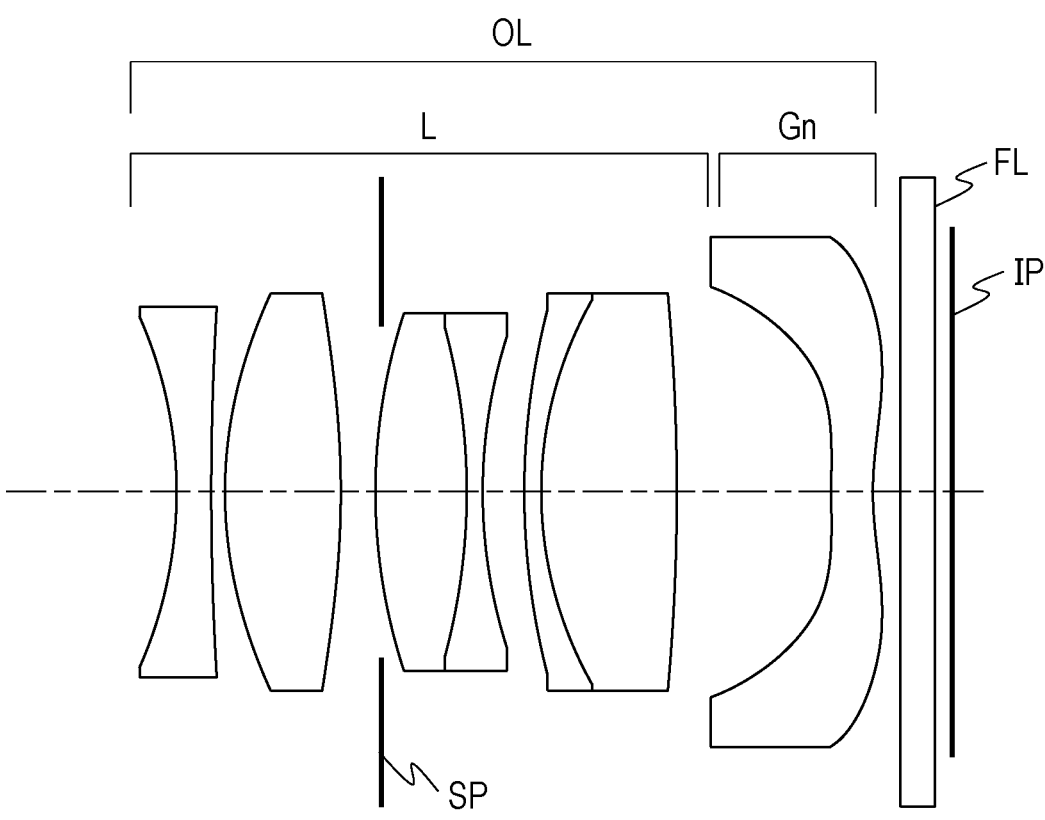
FIG. 3 is a lens cross-sectional view of an optical systems according to a second embodiment.
Figure 4:
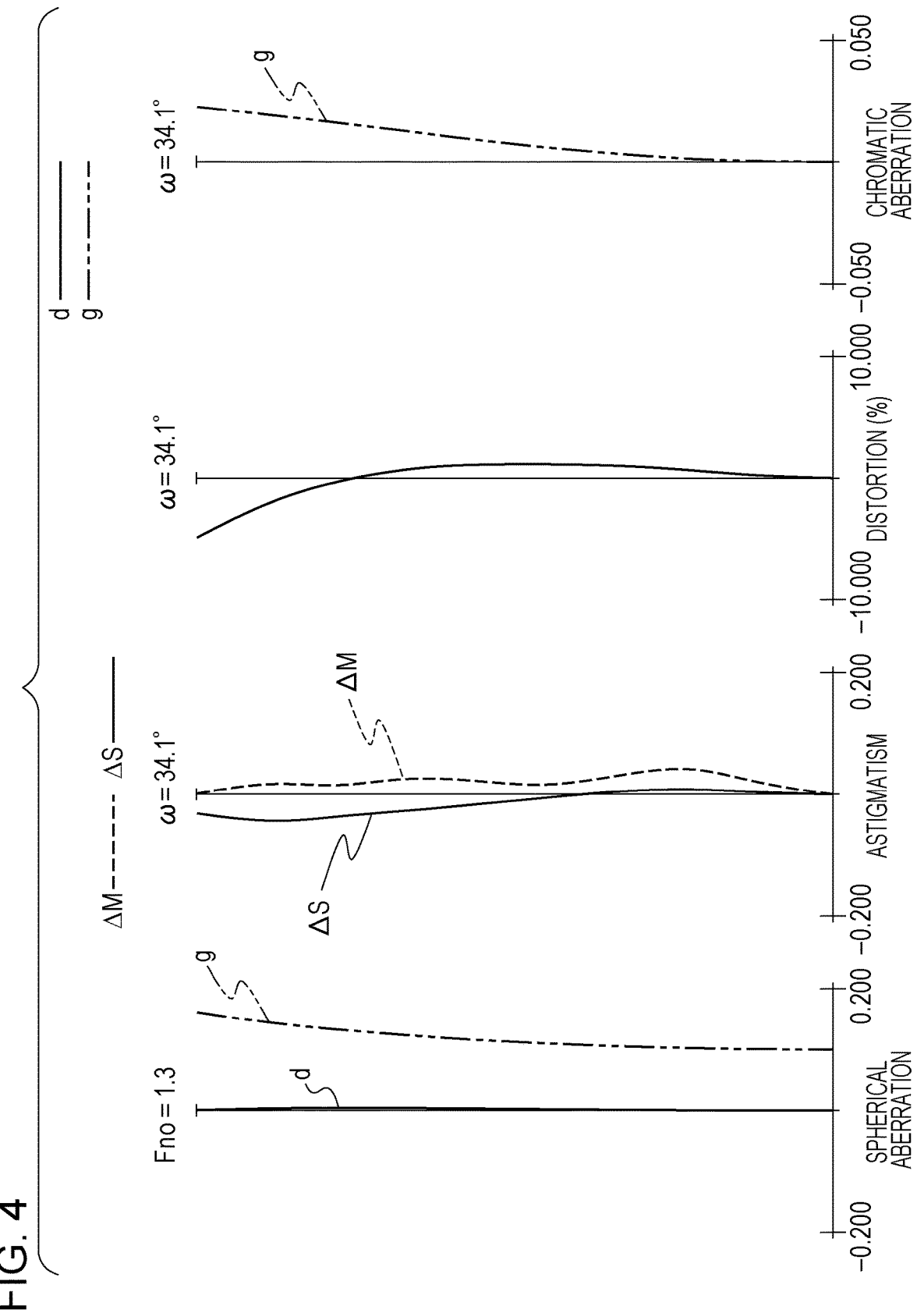
FIG. 4 is an aberration chart of the optical system according to the second embodiment.

The front lens unit L of the optical system OL of the second embodiment shown in FIG. 3 includes a negative lens, a positive lens, the aperture stop SP, a joined lens of a positive lens and a negative lens, and a joined lens of a negative lens and a positive lens arranged in order from the object side to the image side.

Figure 5:
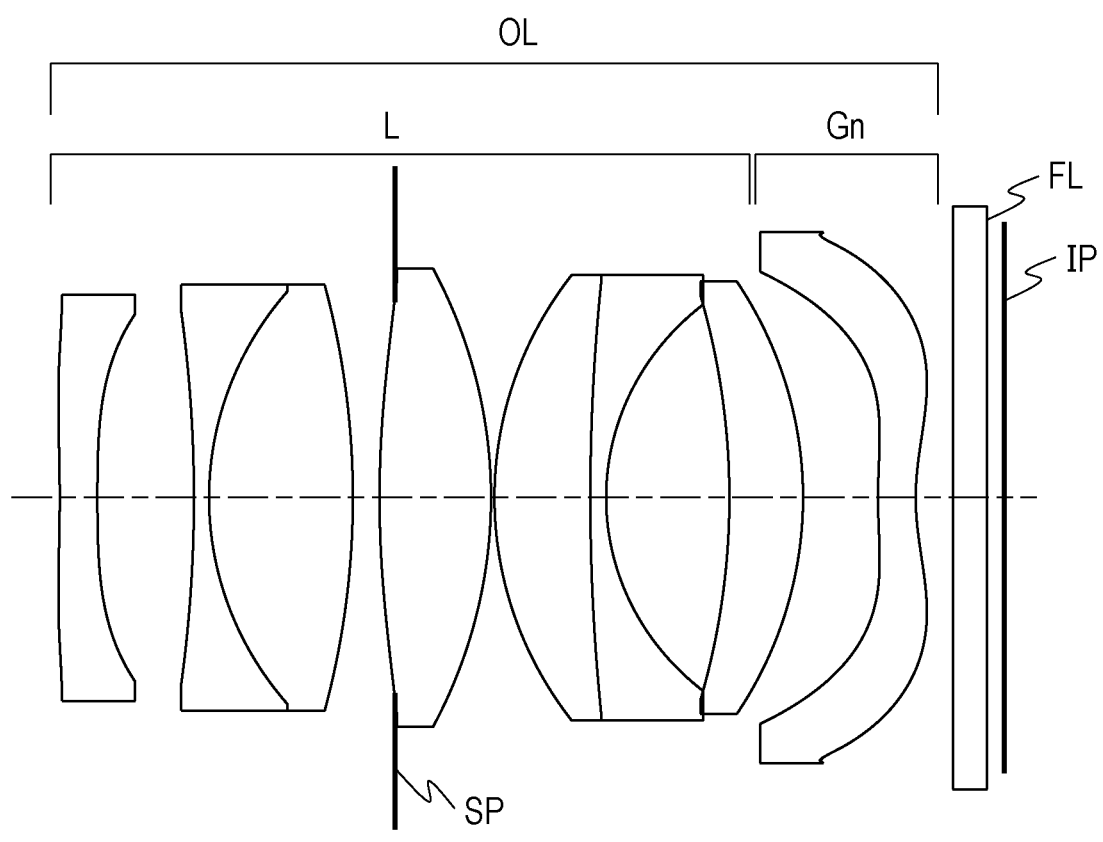
FIG. 5 is a lens cross-sectional view of an optical systems according to a third embodiment.
Figure 6:
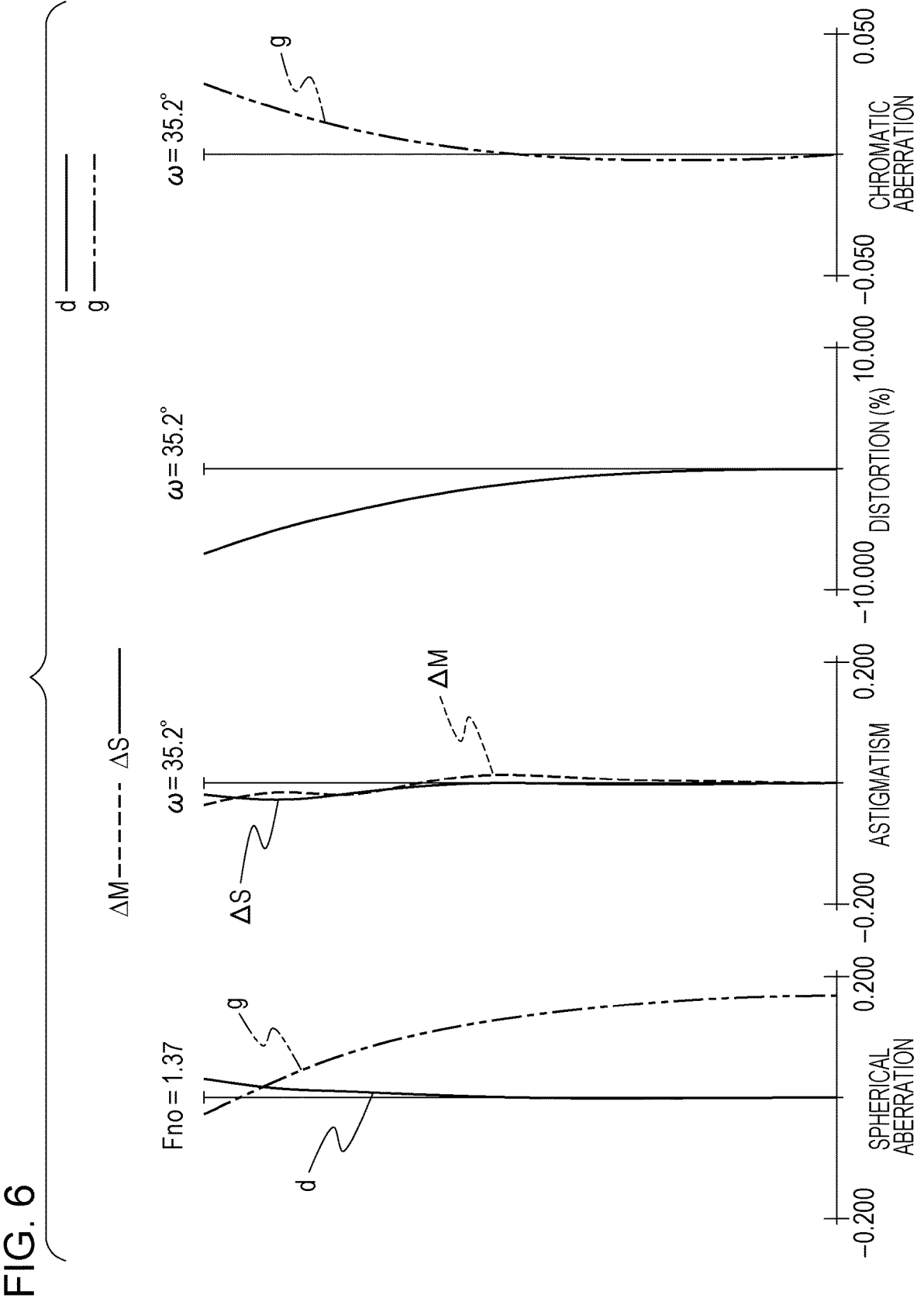
FIG. 6 is an aberration chart of the optical system according to the third embodiment.

The front lens unit L of the optical system OL of the third embodiment shown in FIG. 5 includes a negative lens, a joined lens of a negative lens and a positive lens, the aperture stop SP, a positive lens, a joined lens of a positive lens and a negative lens, and a positive lens arranged in order from the object side to the image side.

Figure 7:
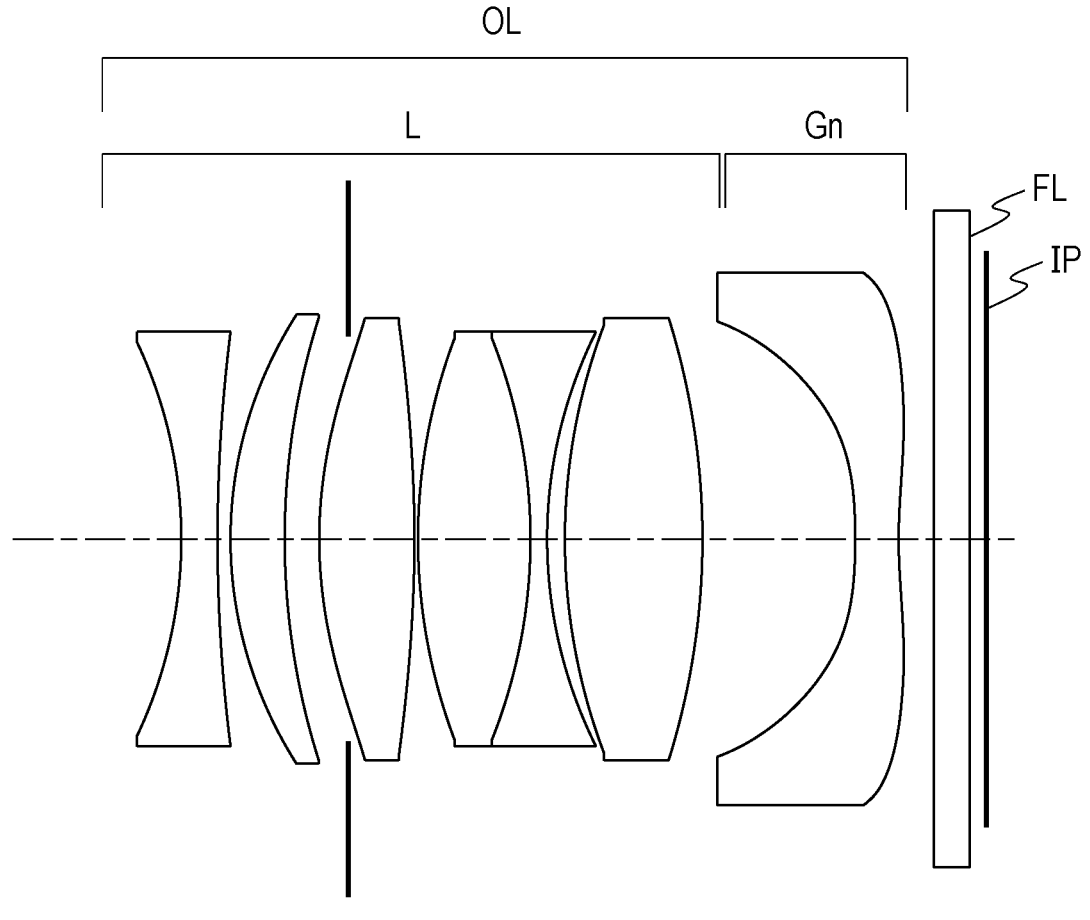
FIG. 7 is a lens cross-sectional view of an optical systems according to a fourth embodiment.
Figure 8:
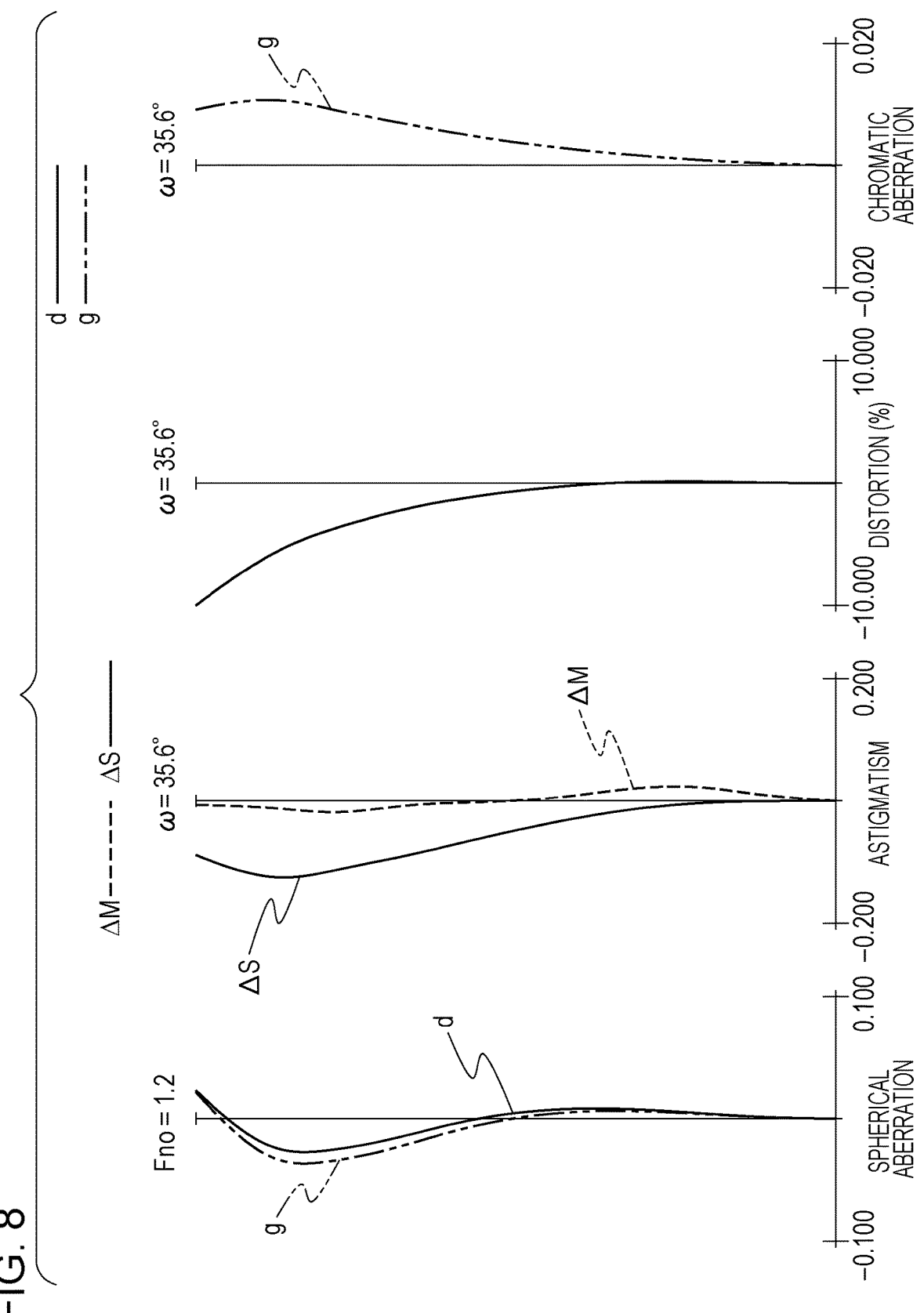
FIG. 8 is an aberration chart of the optical system according to the fourth embodiment.

The front lens unit L of the optical system OL of the fourth embodiment shown in FIG. 7 includes a negative lens, a positive lens, the aperture stop SP, a positive lens, a joined lens of a positive lens and a negative lens, and a positive lens arranged in order from the object side to the image side.

Figure 9:
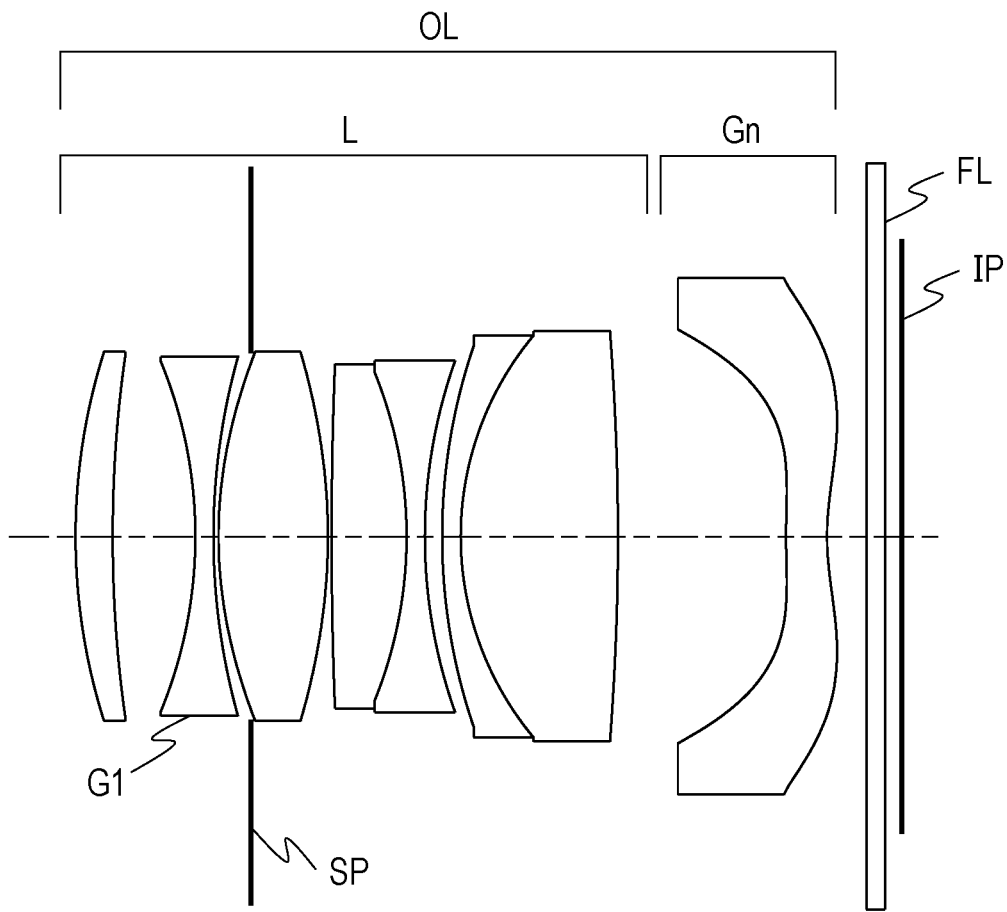
FIG. 9 is a lens cross-sectional view of an optical systems according to a fifth embodiment.
Figure 10:
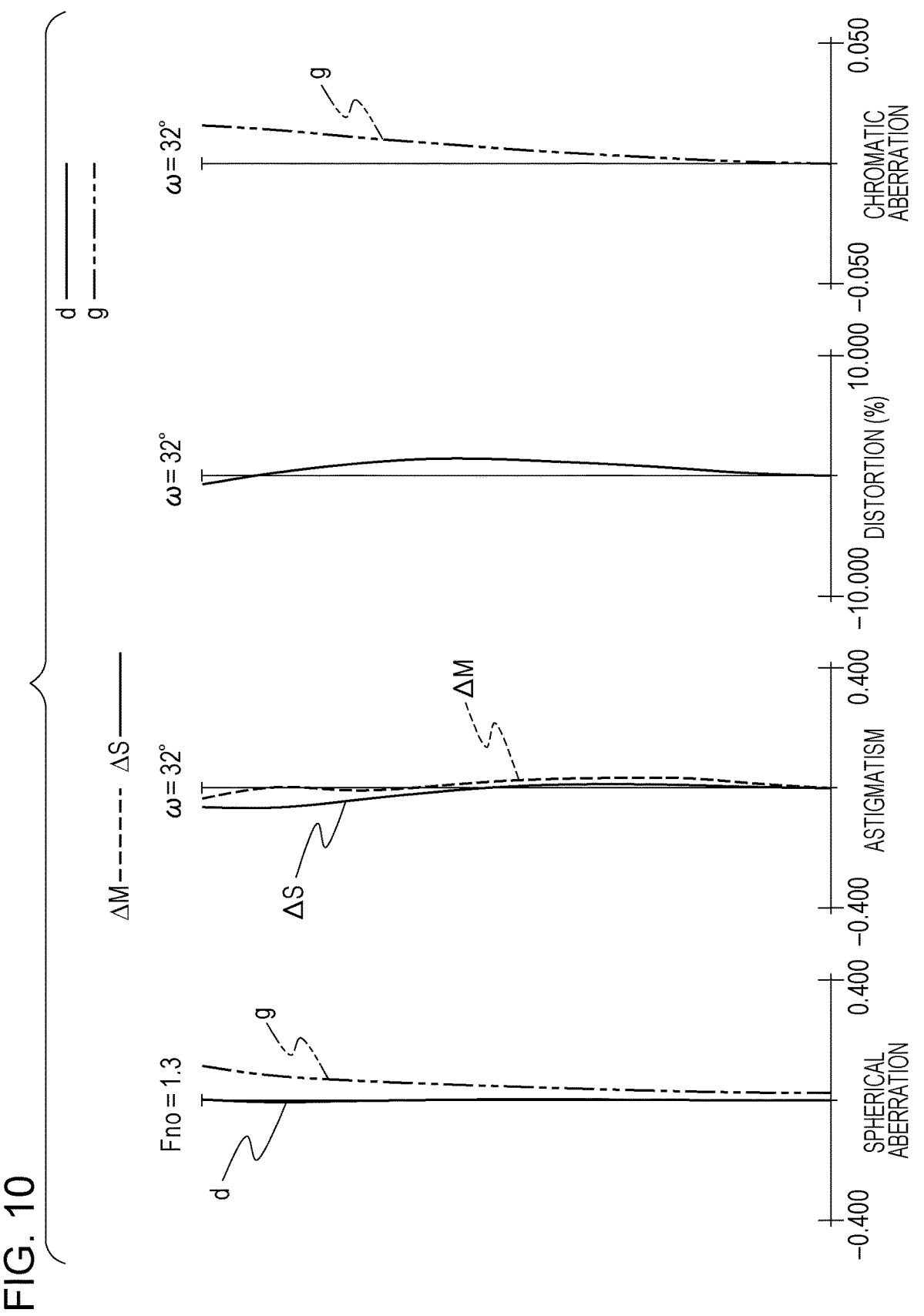
FIG. 10 is an aberration chart of the optical system according to the fifth embodiment.

The front lens unit L of the optical system OL of the fifth embodiment shown in FIG. 9 includes a positive lens, a negative lens, the aperture stop SP, a positive lens, a joined lens of a positive lens and a negative lens, and a joined lens of a negative lens and a positive lens arranged in order from the object side to the image side.

The following are Numerical Examples 1 to 5 corresponding to the first to fifth embodiments, respectively.

In the surface data of the numerical examples, r denotes the curvature radius of each optical surface, d (mm) denotes on-axis interval (the distance on the optical axis) between the m-th surface and the (m+1)th surface, where m is the number of a surface counted from the light incident surface, nd denotes the refractive index of each optical member for d-line, and vd denotes the Abbe number of the optical member. The Abbe number vd of some material is expressed as:

$$vd=(Nd-1)/(NF-NC)$$

where Nd, NF, and NC are the respective refractive indices of Fraunhofer lines, d-line (587.6 nm), F-line (486.1 nm), and C-line (656.3 nm).

If the optical surface is an aspherical surface, sine * is put to the right of the surface number. The shape of the aspherical surface is expressed as, $$x=(h^2/R)/[1+\{1-(1+k)(h/R)^2\}^{1/2}]+A4\times h^4+A6\times h^6+A8\times h^8+A10\times h^{10}+A12\times h^{12}$$

where x is the displacement from the surface apex in the optical axis direction, h is the height from the optical axis in the direction perpendicular to the optical axis, R is the radius of paraxial curvature, k is conic constant, and A4, A6, A8, A10, and A12 . . . are the aspherical coefficients of the individual orders, respectively.

Sign "e±XX" in the individual aspherical coefficients indicates "×$10^{\pm XX}$".

NUMERICAL EXAMPLE 1 in mm
Surface Data

| Surface number | r | d | nd | vd | Effective diameter |
|---|---|---|---|---|---|
| 1 | −13.230 | 0.65 | 1.56732 | 42.8 | |
| 2 | −556.432 | 0.10 | | | |
| 3 | 12.115 | 1.63 | 2.00100 | 29.1 | |
| 4 | 23.466 | 1.60 | | | |
| 5 (aperture) | ∞ | −0.50 | | | |
| 6* | 14.904 | 2.40 | 1.76802 | 49.2 | |
| 7* | −23.793 | 0.10 | | | |
| 8 | 91.141 | 3.69 | 1.83481 | 42.7 | |
| 9 | −9.345 | 0.46 | 1.95906 | 17.5 | |
| 10 | 26.563 | 0.86 | | | |
| 11 | −51.000 | 0.49 | 1.51752 | 52.4 | |
| 12 | 11.704 | 3.89 | 2.00100 | 29.1 | |
| 13 | −30.167 | 3.37 | | | |
| 14* | −19.774 | 1.20 | 1.53110 | 55.9 | 11.30 |
| 15* | 15.005 | 0.88 | | | 13.98 |
| 16 | ∞ | 0.50 | 1.51633 | 64.1 | |
| 17 | ∞ | 0.43 | | | |
| Image plane | ∞ | | | | |

Aspherical Surface Data

Sixth surface

K = 0.00000e+000 A4 = −1.13433e−004 A6 = −1.86886e−007 A8 = −1.33697e−008
Seventh surface K = 0.00000e+000 A4 = 1.63863e−004 A6 = −1.05546e−006 A8 = −2.97841e−009
14th surface K = 0.00000e+000 A4 = −3.79721e−003 A6 = 8.71603e−005 A8 = −7.64087e−007
A10 = −1.93734e−008 A12 = 4.17224e−010
15th surface K = 0.00000e+000 A4 = −2.85274e−003 A6 = 7.79552e−005 A8 = −1.39826e−006
A10 = 1.42733e−008 A12 = −6.07417e−011

| | |
|---|---|
| Focal length | 12.39 |
| F-number | 1.30 |
| Half angle of view (°) | 32.84 |
| Image height | 8.00 |
| Overall lens length | 21.75 |

NUMERICAL EXAMPLE 2

| | | | in mm Surface Data | | |
|---|---|---|---|---|---|
| Surface number | r | d | nd | vd | Effective diameter |
| 1 | −13.635 | 1.00 | 1.63930 | 44.9 | |
| 2 | 99.154 | 0.39 | | | |
| 3* | 13.334 | 3.34 | 1.85135 | 40.1 | |
| 4* | −28.879 | 1.16 | | | |
| 5 (aperture) | ∞ | −0.16 | | | |
| 6 | 18.082 | 2.64 | 1.83400 | 37.2 | |
| 7 | −19.812 | 0.49 | 1.95906 | 17.5 | |
| 8 | 16.122 | 1.20 | | | |
| 9 | 22.990 | 0.49 | 1.51742 | 52.4 | |
| 10 | 12.198 | 3.91 | 1.95375 | 32.3 | |
| 11 | −69.042 | 4.46 | | | |
| 12* | 58.200 | 1.20 | 1.63560 | 23.9 | 10.93 |
| 13* | 10.051 | 0.79 | | | 13.74 |
| 14 | ∞ | 1.00 | 1.51633 | 64.1 | |
| 15 | ∞ | 0.50 | | | |
| Image plane | ∞ | | | | |

Aspherical Surface Data

Third surface

K = 0.00000e+000 A4 = −9.49960e−005 A6 = 8.85709e−008 A8 = 8.38781e−009
Fourth surface K = 0.00000e+000 A4 = 5.89387e−005 A6 = 2.33112e−008 A8 = 1.02643e−008
12th surface K = 0.00000e+000 A4 = −4.66496e−003 A6 = 1.73987e−004 A8 = −7.91841e−006
A10 = 2.13902e−007 A12 = −2.31797e−009
13th surface K = 0.00000e+000 A4 = −3.43721e−003 A6 = 1.12362e−004 A8 = −2.98646e−006
A10 = 4.53813e−008 A12 = −2.87945e−010

| | |
|---|---|
| Focal length | 12.40 |
| F-number | 1.30 |
| Half angle of view (°) | 32.83 |
| Image height | 8.00 |
| Overall lens length | 22.05 |
| BF | 1.95 |

NUMERICAL EXAMPLE 3

| | | | in mm Surface Data | | |
|---|---|---|---|---|---|
| Surface number | r | d | nd | vd | Effective diameter |
| 1* | −50.102 | 1.10 | 1.85135 | 40.1 | |
| 2* | 60.435 | 2.82 | | | |
| 3 | −43.713 | 0.44 | 1.69895 | 30.1 | |
| 4 | 9.812 | 4.20 | 1.83400 | 37.2 | |
| 5 | −26.101 | 1.24 | | | |
| 6 (aperture) | ∞ | −0.46 | | | |
| 7* | 34.752 | 3.25 | 1.85135 | 40.1 | |
| 8* | −15.201 | 0.10 | | | |
| 9 | 11.387 | 2.80 | 1.83400 | 37.2 | |
| 10 | 69.014 | 0.46 | 1.95906 | 17.5 | |
| 11 | 7.552 | 3.60 | | | |
| 12 | −23.007 | 2.15 | 1.69895 | 30.1 | |
| 13 | −12.236 | 2.19 | | | |
| 14* | 20.283 | 1.10 | 1.53110 | 55.9 | 12.29 |
| 15* | 8.129 | 1.08 | | | 14.23 |

-continued

| | | in mm<br>Surface Data | | |
|---|---|---|---|---|
| 16 | ∞ | 1.00 | 1.51633 | 64.1 |
| 17 | ∞ | 0.50 | | |
| Image<br>plane | ∞ | | | |

Aspherical Surface Data

First surface

K = 0.00000e+000 A4 = 7.62920e−004 A6 = −1.51293e−005 A8 = 1.15810e−007
A10 = −8.03081e−010
Second surface K = 0.00000e+000 A4 = 1.08116e−003 A6 = −9.48912e−006 A8 = 6.59401e−008
Seventh surface K = 0.00000e+000 A4 = −4.96708e−005 A6 = −5.81139e−007 A8 = 8.30871e−009
A10 = −1.26619e−010
Eighth surface K = 0.00000e+000 A4 = 5.56396e−006 A6 = −2.06162e−008 A8 = 4.56601e−010
14th surface K = 0.00000e+000 A4 = −3.77565e−003 A6 = 7.45432e−005 A8 = −1.07369e−006
A10 = 5.61779e−009
15th surface K = 0.00000e+000 A4 = −3.98006e−003 A6 = 9.25568e−005 A8 = −2.12771e−006
A10 = 2.98794e−008 A12 = −2.01103e−010

| Various Data | |
|---|---|
| Focal length | 12.20 |
| F-number | 1.37 |
| Half angle of view (°) | 33.25 |
| Image height | 8.00 |
| Overall lens length | 27.23 |
| BF | 2.24 |

NUMERICAL EXAMPLE 4

| | | | in mm<br>Surface Data | | |
|---|---|---|---|---|---|
| Surface<br>number | r | d | nd | vd | Effective<br>diameter |
| 1 | −13.868 | 1.00 | 1.56732 | 42.8 | |
| 2 | 50.002 | 0.36 | | | |
| 3 | 12.482 | 1.50 | 2.00100 | 29.1 | |
| 4 | 22.261 | 1.76 | | | |
| 5<br>(aperture) | ∞ | −0.81 | | | |
| 6* | 13.699 | 2.63 | 1.76802 | 49.2 | |
| 7* | −38.118 | 0.10 | | | |
| 8 | 17.204 | 3.11 | 1.49700 | 81.5 | |
| 9 | −16.333 | 0.46 | 1.89286 | 20.4 | |
| 10 | 14.000 | 0.49 | | | |
| 11 | 18.318 | 3.80 | 2.00100 | 29.1 | |
| 12 | −22.325 | 4.22 | | | |
| 13* | −19.695 | 1.20 | 1.53110 | 55.9 | 11.53 |
| 14* | 16.255 | 0.97 | | | 14.38 |
| 15 | ∞ | 1.00 | 1.51633 | 64.1 | |
| 16 | ∞ | 0.45 | | | |
| Image<br>plane | ∞ | | | | |

-continued in mm
Surface Data

Aspherical Surface Data

Sixth surface

K = 0.00000e+00 A4 = −1.54601e−04 A6 = 7.86515e−07 A8 = −4.25057e−08
Seventh surface K = 0.00000e+00 A4 = 9.17321e−05 A6 = 4.92069e−08 A8 = −2.57543e−08
13th surface K = 0.00000e+00 A4 = −3.60228e−03 A6 = 1.48933e−04 A8 = −5.68173e−06
A10 = 1.33854e−07 A12 = −1.40815e−09
14th surface K = 0.00000e+00 A4 = −2.44186e−03 A6 = 9.07676e−05 A8 = −2.27946e−06
A10 = 3.20157e−08 A12 = −1.96449e−10

| | |
|---|---|
| Focal length | 12.40 |
| F-number | 1.20 |
| Half angle of view (°) | 32.83 |
| Image height | 8.00 |
| Overall lens length | 21.89 |
| BF | 2.08 |

NUMERICAL EXAMPLE 5 in mm
Surface Data

| Surface number | r | d | nd | vd | Effective diameter |
|---|---|---|---|---|---|
| 1 | 16.592 | 1.00 | 2.00100 | 29.1 | |
| 2 | 35.757 | 2.22 | | | |
| 3 | −12.450 | 0.49 | 1.64769 | 33.8 | |
| 4 | 18.208 | 1.00 | | | |
| 5 (aperture) | ∞ | −0.87 | | | |
| 6* | 12.197 | 2.94 | 1.85135 | 40.1 | |
| 7* | −16.387 | 0.10 | | | |
| 8 | 118.520 | 2.02 | 1.72916 | 54.7 | |
| 9 | −11.807 | 0.49 | 1.80810 | 22.8 | |
| 10 | 14.190 | 0.47 | | | |
| 11 | 16.029 | 0.50 | 1.78472 | 25.7 | |
| 12 | 8.467 | 4.23 | 2.00100 | 29.1 | |
| 13 | −71.075 | 4.53 | | | |
| 14* | 25.229 | 1.10 | 1.53110 | 55.9 | 10.83 |
| 15* | 7.268 | 1.06 | | | 13.45 |
| 16 | ∞ | 0.50 | 1.51633 | 64.1 | |
| 17 | ∞ | 0.45 | | | |
| Image plane | ∞ | | | | |

Aspherical Surface Data

Sixth surface

K = 0.00000e+00 A4 = −1.14931e−04 A6 = 4.45417e−07 A8 = −2.36743e−08
Seventh surface K = 0.00000e+00 A4 = 5.95842e−05 A6 = 2.16407e−07 A8 = −1.41825e−08
14th surface K = 0.00000e+00 A4 = −6.87777e−03 A6 = 2.46251e−04 A8 = −7.49558e−06
A10 = 9.35756e−08
15th surface K = 0.00000e+00 A4 = −6.38748e−03 A6 = 2.48242e−04 A8 = −7.63309e−06
A10 = 1.27959e−07 A12 = −9.02853e−10

-continued

| in mm Surface Data | |
| --- | --- |
| Various data | |
| Focal length | 12.80 |
| F-number | 1.30 |
| Half angle of view (°) | 32.00 |
| Image height | 8.00 |
| Overall lens length | 22.06 |
| BF | 1.84 |

The table below shows various values in the optical systems OL of the embodiments.

TABLE 1

| | FIRST EMBODIMENT | SECOND EMBODIMENT | THIRD EMBODIMENT | FOURTH EMBODIMENT | FIFTH EMBODIMENT |
| --- | --- | --- | --- | --- | --- |
| (1) $-10.0 < fn/f < -0.7$ | $-1.281$ | $-1.557$ | $-2.162$ | $-1.337$ | $-1.534$ |
| (2) $0.9 < D/ST < 1.4$ | 1.116 | 1.093 | 0.956 | 0.984 | 1.107 |
| (3) $-0.50 < SAG1/f < -0.16$ | $-0.230$ | $-0.172$ | $-0.178$ | $-0.224$ | $-0.206$ |
| (4) $-0.35 <- SAG2/f < 0$ | $-0.065$ | $-0.041$ | $-0.116$ | $-0.042$ | $-0.081$ |
| (5) $0.5 < GnR2/f < 10$ | 1.211 | 0.811 | 0.666 | 1.311 | 0.568 |
| (6) $0.1 < Td/f < 2.5$ | 1.742 | 1.778 | 2.232 | 1.766 | 1.723 |
| (7) $0 < STd/f < 0.15$ | 0.089 | 0.081 | 0.064 | 0.077 | 0.010 |
| (8) $0.05 < skd/SL < 0.15$ | 0.093 | 0.121 | 0.128 | 0.120 | 0.106 |
| (9) $1.45 < NdGn < 1.70$ | 1.531 | 1.636 | 1.531 | 1.531 | 1.531 |
| (10) $0.6 < gGn < 1.7$ | 1.010 | 1.240 | 1.010 | 1.010 | 1.010 |
| (11) $0.08 < SF1 < 12.0$ | 1.328 | 0.758 | 0.093 | 0.566 | 2.731 |
| (12) $0.6 < |f1/f2| < 5.0$ | 1.024 | 1.680 | 2.803 | 0.722 | 2.657 |
| (13) $1.78 < NdGp < 2.20$ | 1.901 | 1.880 | 1.805 | 1.817 | 1.896 |

Image Capturing Apparatus

Figure 11:
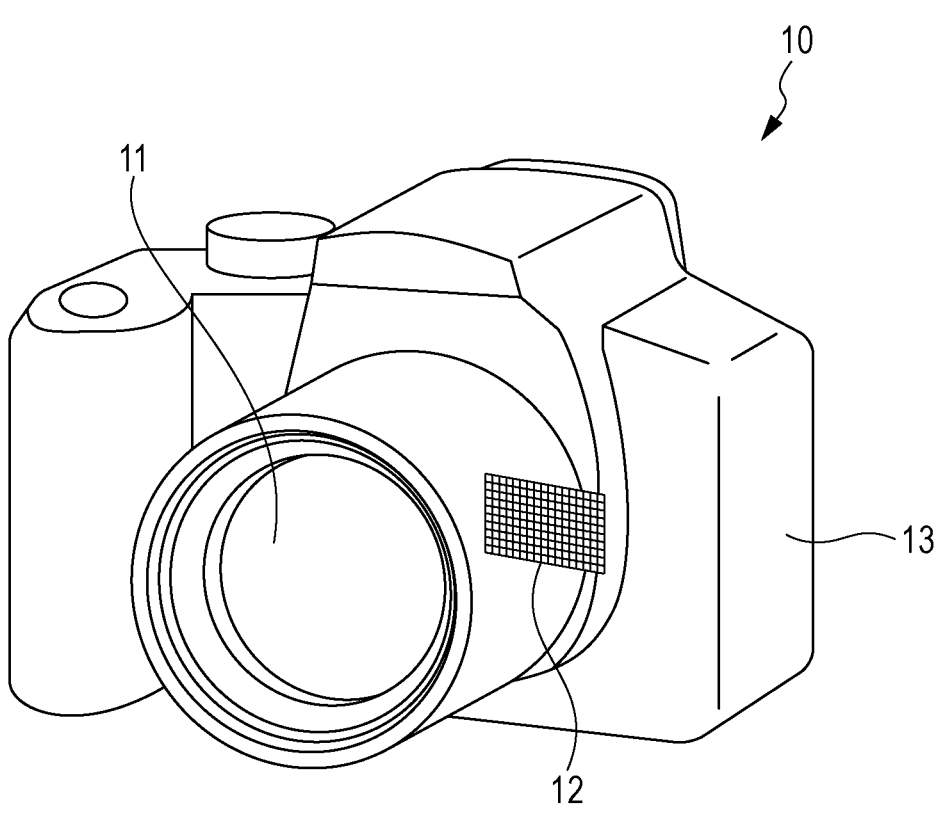
FIG. 11 is a schematic diagram illustrating an image capturing apparatus.

A digital still camera (an image capturing apparatus) 10 including the optical system OL according to an embodiment of the disclosure will be described with reference to FIG. 11. In FIG. 11, reference sign 13 denotes a camera body, and 11 denotes a lens apparatus including the optical system OL described in one of the first to fifth embodiments.

Reference sign 12 denotes a solid-state image sensor (photoelectric conversion element), such as a CCD sensor or a CMOS sensor, which is housed in the camera body 13 and receives an optical image formed by the lens apparatus 11 and photoelectrically converts the image. The camera 10 may be a what-is-called single-lens reflex camera including a quick turn mirror or a what-is-called mirrorless camera with no quick turn mirror.

Application of the optical system OL according to an embodiment of the disclosure to an image capturing apparatus, such as a digital camera, provides a compact lightweight image capturing apparatus capable of providing high-quality images while ensuring a sufficient amount of light.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-191527 filed Nov. 25, 2021, which is hereby incorporated by reference herein in its entirety.

What is claimed is:

1. A system consisting of a front lens unit and a negative lens Gn on an image side of the front lens unit, wherein the following inequalities are satisfied:

$$-10.0 < fn/f < -0.7$$

$$0.9 < D/ST < 1.4$$

$$-0.50 < SAG1/f < -0.16$$

$$1.78 < NdGp < 2.2$$

where f is a focal length of the system, fn is a focal length of the negative lens Gn, D is an effective diameter of a lens surface on an object side of the negative lens Gn, ST is a diameter of an aperture stop that determines an on-axis ray, SAG1 is an on-axis distance from an endmost point in a light effective area of the lens surface on the object side of the negative lens Gn to an on-axis point of the negative lens Gn, and NdGp is an average refractive index of positive lenses in the system.

2. The system according to claim 1, wherein the following inequality is satisfied:

$$-0.35 < -SAG2/f < 0$$

where SAG2 is an on-axis distance from an endmost point in a light effective area of a lens surface on an image side of the negative lens Gn to an on-axis point of the lens surface on the image side of the negative lens Gn.

3. The system according to claim 1, wherein the following inequality is satisfied:

$$0.5 < GnR2/f < 10$$

where GnR2 is a radius of curvature of a lens surface on an image side of the negative lens Gn.

4. The system according to claim 1, wherein the following inequality is satisfied:

$$0.1 < Td/f < 2.5$$

where Td is an on-axis length from a surface vertex of a lens surface closest to the object side in the system to an image plane, where, in Td, a distance from a lens surface closest to the image side to the image plane is an equivalent air length.

5. The system according to claim 1, wherein the following inequality is satisfied:

$$0 < STd/f < 0.15$$

where STd is an on-axis distance from a surface vertex on the image side of a lens located adjacent to the aperture stop on the object side to a surface vertex on the object side of a lens located adjacent to the aperture stop on the image side.

6. The system according to claim 1, wherein the following inequality is satisfied:

$$0.05 < skd/SL < 0.15$$

where skd is an on-axis equivalent air length from a lens surface on an image side of the negative lens Gn to an image plane, SL is an on-axis length from the aperture stop to the image plane, where, in SL, a distance from a lens surface closest to the image side to the image plane is an equivalent air length.

7. The system according to claim 1, wherein the following inequality is satisfied:

$$1.45 < NdGn < 1.70$$

where NdGn is a refractive index of the negative lens Gn.

8. The system according to claim 1, wherein the following inequality is satisfied:

$$0.6 < gGn < 1.7$$

where gGn is a specific gravity (g/mm$^3$) of a material for the negative lens Gn.

9. The system according to claim 1, wherein the following inequality is satisfied:

$$0.08 < SF1 < 12.0$$

where SF1 is a shape factor of a lens G1 closest to the object side in the system.

10. The system according to claim 1, wherein the following inequality is satisfied:

$$0.6 < |f1/f2| < 5.0$$

where f1 is a focal length a lens G1 closest to the object side in the system, and f2 is a focal length of a second lens G2 counted from the object side in the system.

11. The system according to claim 1, wherein a lens surface on an image side of the negative lens Gn is an aspheric surface having at least one extreme point.

12. The system according to claim 1, wherein the front lens unit includes at least six lenses.

13. The system according to claim 1, wherein a lens G1 closest to the object side in the system is a negative lens that is concave on the object side.

14. The system according to claim 1, wherein the front lens unit includes:

a negative lens closest to the object side;

a positive lens adjacent to an image side of the negative lens; and a positive lens adjacent to the image side of the positive lens.

15. An apparatus comprising:

the system according to claim 1; and a sensor that receives an image formed by the system.

16. The apparatus according to claim 15, wherein the following inequality is satisfied:

$$-0.35 < -SAG2/f < 0$$

where SAG2 is an on-axis distance from an endmost point in a light effective area of a lens surface on an image side of the negative lens Gn to an on-axis point of the lens surface on the image side of the negative lens Gn.

17. The apparatus according to claim 15, wherein the following inequality is satisfied:

$$0.5 < GnR2/f < 10$$

where GnR2 is a radius of curvature of a lens surface on an image side of the negative lens Gn.

18. The apparatus according to claim 15, wherein the following inequality is satisfied:

$$0.1 < Td/f < 2.5$$

where Td is an on-axis equivalent air length from a surface vertex of a lens surface closest to the object side in the system to an image plane.

19. The apparatus according to claim 15, wherein the following inequality is satisfied:

$$0 < STd/f < 0.15$$

where STd is an interval between surface vertexes of lenses in front of and behind the aperture stop.

* * * * *